United States Patent [19]
Murai

[11] Patent Number: 5,729,601
[45] Date of Patent: Mar. 17, 1998

[54] ELECTRONIC EXCHANGE APPARATUS HAVING SEPARATED EXCHANGE UNIT AND GENERAL-PURPOSE CONTROL UNIT

[75] Inventor: Toshio Murai, Ichikawa, Japan

[73] Assignee: Kabushiki Kaisha Toshiba, Kawasaki, Japan

[21] Appl. No.: 567,586

[22] Filed: Dec. 5, 1995

[30] Foreign Application Priority Data

Dec. 7, 1994 [JP] Japan .................... 6-303871

[51] Int. Cl.$^6$ .................... H04M 3/00; G05R 15/00; G11C 7/00
[52] U.S. Cl. .................... 379/269; 364/132; 364/187; 364/222.3; 364/228.3; 364/230.4; 364/240.5; 379/279; 395/182.1; 395/712
[58] Field of Search .................... 364/132, 187, 364/222.2, 222.3, 228.1, 228.3, 230.4, 238.4, 240.5, 280.2; 379/268, 269, 279, 9, 10, 11, 14, 201, 242, 230; 395/200, 600, 650, 700, 182.1, 200.19, 620, 712

[56] References Cited

U.S. PATENT DOCUMENTS

| | | | |
|---|---|---|---|
| 4,853,956 | 8/1989 | Astmann | 379/269 |
| 5,287,515 | 2/1994 | Murai | 395/700 |
| 5,469,503 | 11/1995 | Butensky et al. | 379/265 |
| 5,533,102 | 7/1996 | Robinson et al. | 379/230 X |

*Primary Examiner*—Harry S. Hong
*Attorney, Agent, or Firm*—Finnegan, Henderson, Farabow, Garrett & Dunner, L.L.P.

[57] ABSTRACT

An electronic exchange apparatus where an exchange unit for controlling extension-line and trunk-line interface cards unique to the exchange apparatus is provided separately from a general-purpose central control unit. The exchange unit is connected to the control unit via an Ethernet and control signals are transmitted between them. The exchange unit is allowed to have only the function of converting the communication protocols between the control-channel highway and the Ethernet which are unique to the exchange apparatus. The control unit is designed to have all of the control functions associated with exchange processing. Thus, a software can be developed easily in a short time, helping reduce development costs and keep up with advances in the CPUs and peripherals.

75 Claims, 5 Drawing Sheets

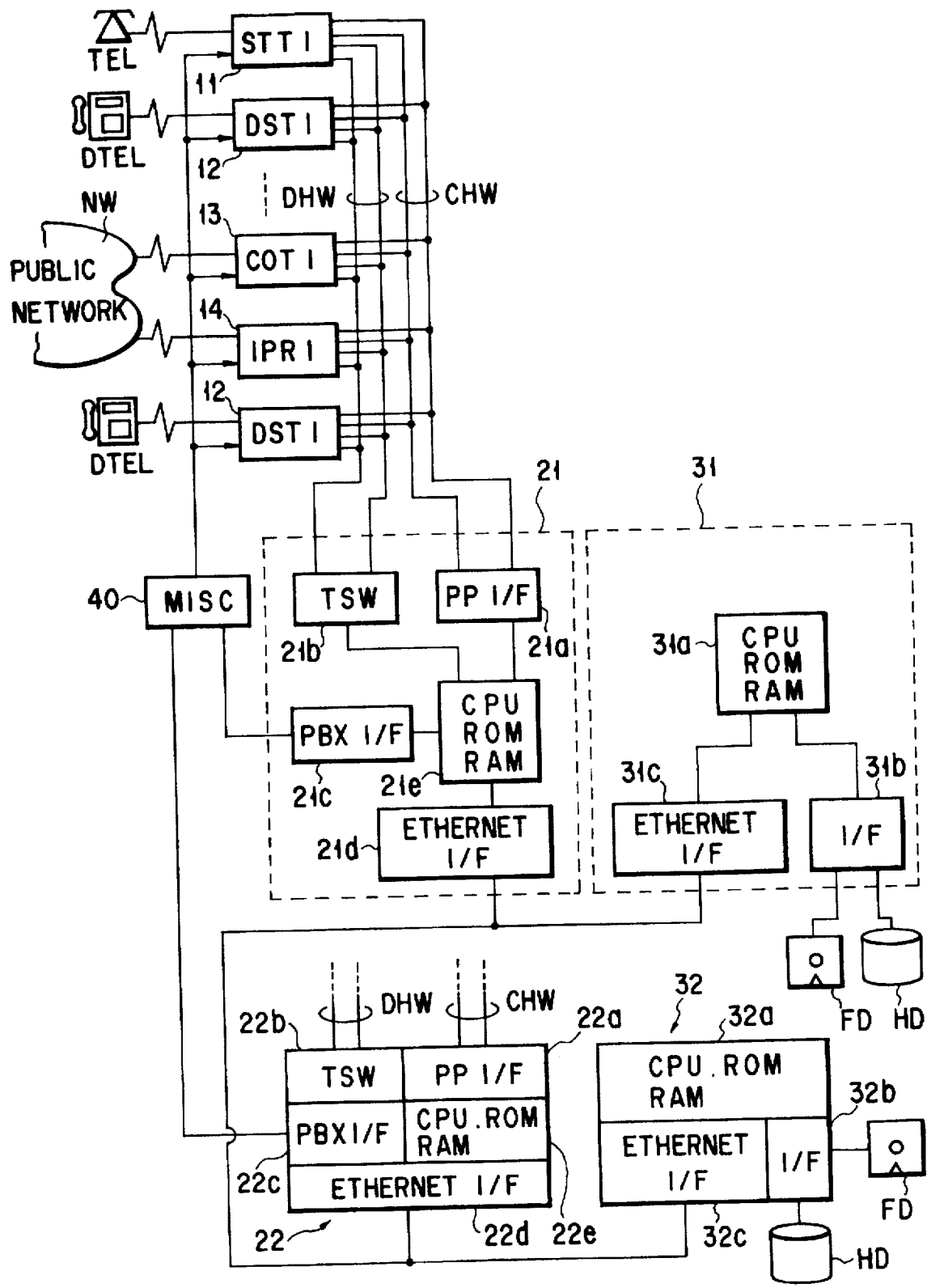
F I G. 1

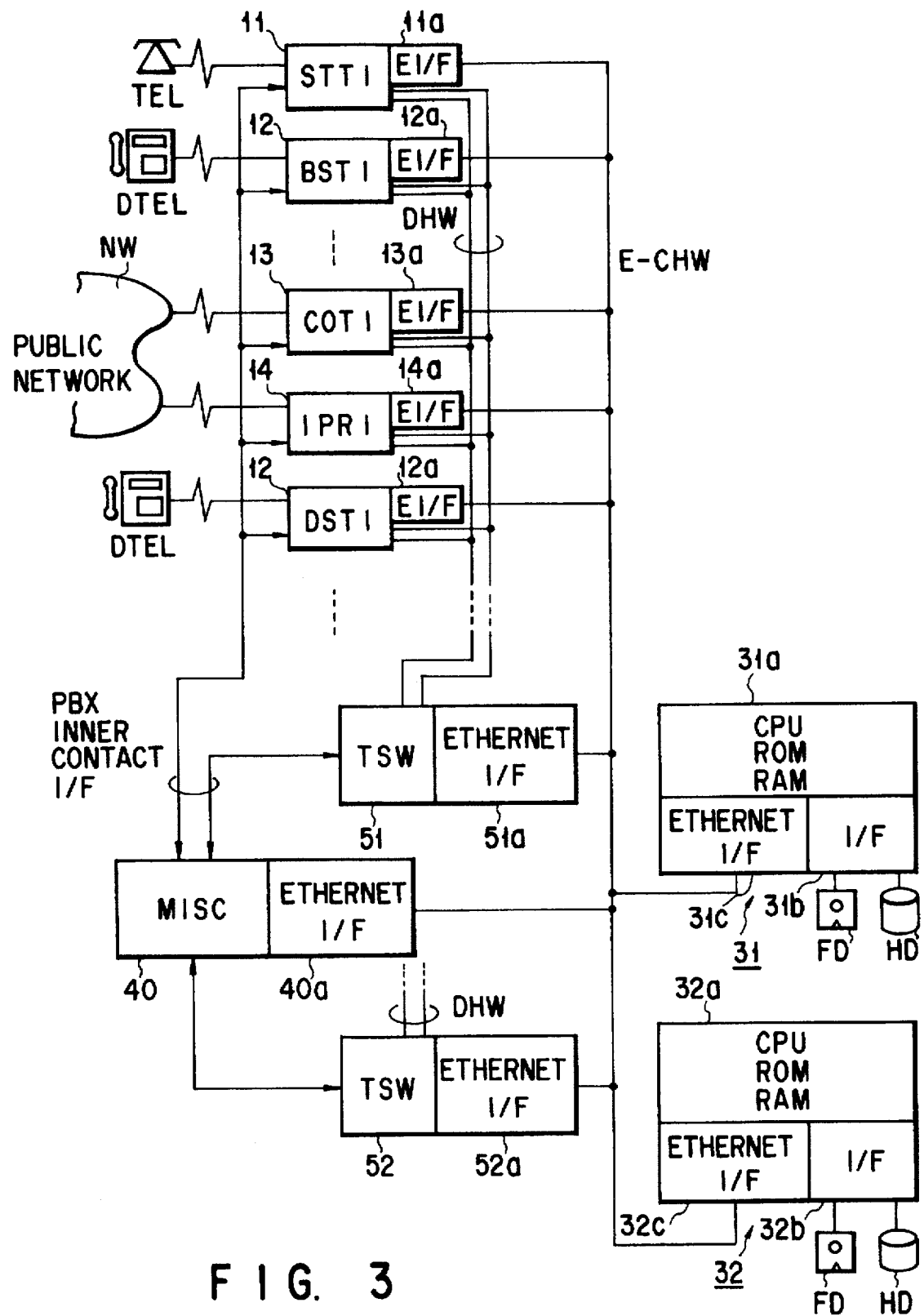
F I G. 3

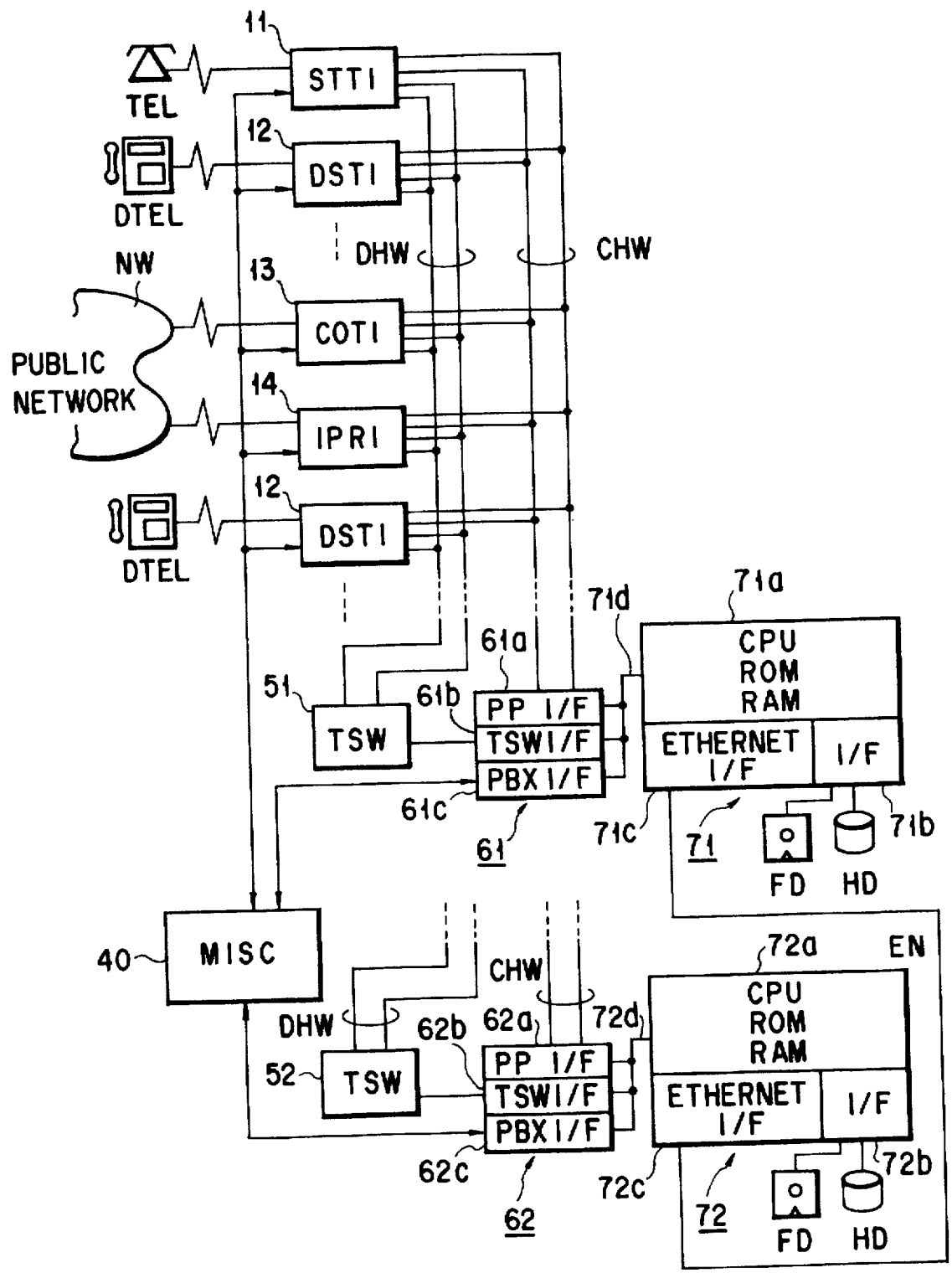
F I G. 4

ELECTRONIC EXCHANGE APPARATUS HAVING SEPARATED EXCHANGE UNIT AND GENERAL-PURPOSE CONTROL UNIT

BACKGROUND OF THE INVENTION

1. Field of the Invention

The present invention relates to an electronic exchange apparatus comprising a control unit composed of a microcomputer and an exchange unit that actually effects exchange processing.

2. Description of the Related Art

With the increasing communication needs and the advances in communication technology, apparatuses provided with various electronic exchange functions, such as private branch exchanges or data communication equipment, have been popularized in recent years. This type of apparatus is generally provided with a microcomputer-based control unit, which supervises and controls the whole operation of the apparatus. The control unit of each apparatus is provided with a dedicated OS (operating system) on dedicated control hardware and is designed to cause the exchange unit—the hardware section provided exclusively for the apparatus—to operate by executing an exchange control application program in the OS environment.

With such a conventional electronic exchange apparatus, however, the software structure in the control unit is specialized for each type of apparatus (or the control unit has its own OS) and a general-purpose computer cannot be connected to the apparatus. This makes it necessary to develop control hardware and software unique to an apparatus each time the apparatus is developed. For example, when an application program for exchange processing is developed, it is necessary to develop the application program on the host computer and download the developed application program to the dedicated hardware environment in the control unit of the electronic exchange apparatus. As a result, the increase of the software development time has led to an increase in the development turnaround time and to the need for a dedicated CPU emulator for software debugging, so that the development has required a lot of time and cost. Furthermore, since dedicated peripheral devices and interfaces must also be developed, it is difficult to keep up with new technology, such as optical disc devices. Therefore, it has been difficult to easily deal with the needs of users, such as upgrading the version.

SUMMARY OF THE INVENTION

It is, accordingly, an object of the present invention to provide an electronic exchange apparatus which not only enables software development easily in a short time and thereby achieves the reduction of development costs, but also is capable of keeping up with advances in the CPUs and peripheral devices.

Another object of the present invention is to provide an electronic exchange apparatus which is composed only of dedicated components related to exchange functions, the main function of which is executed by a computer, and which functions as one peripheral device of the computer.

According to the present invention, an electronic exchange apparatus comprises: exchange means which is connected to a plurality of communication terminal devices, has a hardware unique to the apparatus, and performs an exchange operation between the plurality of communication terminal devices; control means which has a general-purpose software and controls the switching operation of the exchange means; and control signal transmission means which is connected between the control means and the exchange means and bidirectionally transmits the necessary control signal for the exchange operation of the exchange means.

With the electronic exchange apparatus of the present invention, because the hardware function unique to the exchange apparatus is minimized and most of the control function is put together in the general-purpose control unit, this makes it possible to develop software easily in a short time and reduce development costs, with the result that it is possible to provide an electronic exchange apparatus capable of easily keeping up with advances in the CPUs and peripherals. Furthermore, with the present invention, because the electronic exchange apparatus can be designed as a peripheral for an existing general-purpose computer, it can harmonize with the computer easily.

Additional objects and advantages of the present invention will be set forth in the description which follows, and in part will be obvious from the description, or may be learned by practice of the present invention.

The objects and advantages of the present invention may be realized and obtained by means of the instrumentality and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram of the hardware configuration of an electronic private branch exchange apparatus according to a first embodiment of the present invention;

FIG. 3 is a block diagram of the hardware configuration of an electronic private branch exchange apparatus according to a second embodiment of the present invention;

FIG. 4 is a block diagram of the hardware configuration of an electronic private branch exchange apparatus according to a third embodiment of the present invention.

DETAILED DESCRIPTION OF THE PREFERRED EMBODIMENTS

Figure 2:
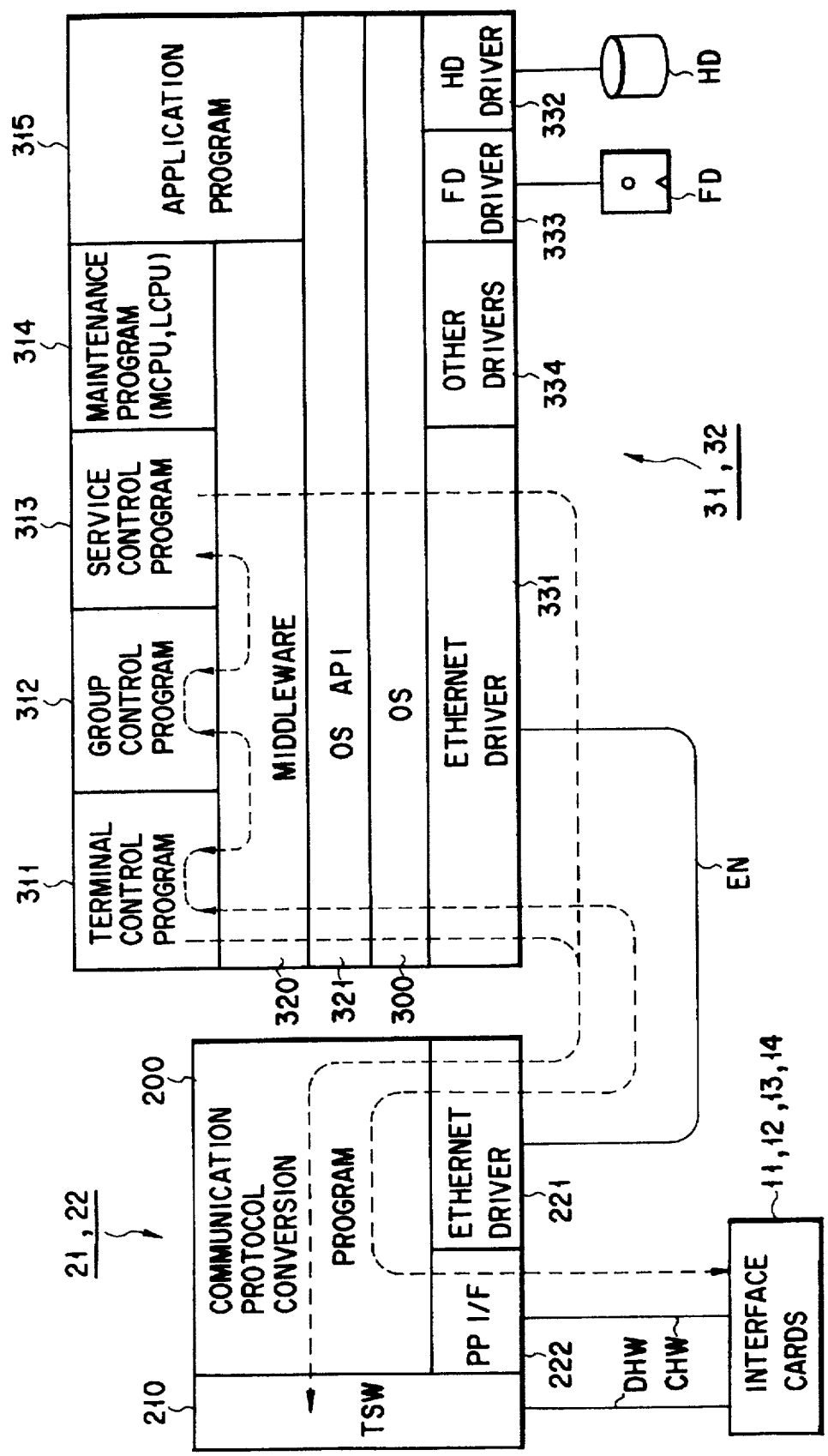
FIG. 2 shows the structure of software for the electronic private branch exchange apparatus according to the first embodiment.

A preferred embodiment of an electronic exchange apparatus according to the present invention will now be described with reference to the accompanying drawings.

(A first embodiment)

FIG. 1 is a block diagram of an electronic private branch exchange apparatus according to a first embodiment of the present invention. The embodiment comprises an exchange unit composed of the hardware unique to the apparatus that actually effects exchange processing by controlling a group of circuit lines unique to the exchange apparatus, such as extension-line interfaces or trunk line interfaces, and a control unit composed of general-purpose software that executes various types of control related to the exchange process. The embodiment is designed to transmit control signals via signal transmission means, for example, Ethernet, between the exchange unit and the control unit that are separated away from each other. Ethernet is one of general-purpose local area networks (LANs) in a bus configuration. CSMA/CD (carrier sense multiple access with collision detection) techniques are used for bus control.

In FIG. 1, a standard telephone TEL and a multifunction digital telephone DTEL are connected to a standard extension telephone interface card (STTI) 11 and a multifunction digital interface card (DSTI) 12, respectively. The individual extension telephone interface cards 11 and 12 sense the call origination signals and dial signals from the telephones TEL and DTEL respectively, and transmit incoming call signals to the telephones TEL and DTEL.

An analog trunk-line interface card (COTI) 13 and an ISDN trunk-line interface card (IPRI) 14 are connected to a public network NW. The individual trunk line interface cards 13 and 14 sense the incoming call signal from the public network NW and transmit call origination signal and dial signal to the public network NW.

The present embodiment is provided with duplicated exchange units 21, 22 for controlling the interface cards 11 to 14, duplicated control units 31, 32, Ethernet EN that connects the exchange units 21, 22 to the control units 31, 32 or vice versa, and a duplicated system control circuit MISC 40.

The exchange units 21, 22 are composed of port processor interfaces (PP I/F) 21a, 22a, time switches (TSW) 21b, 22b, PBX interfaces (PBX I/F) 21c, 22c, Ethernet interfaces (E I/F) 21d, 22d, and microcomputers 21e, 22e, each made up of a CPU, a ROM, and a RAM, respectively. Though the exchange unit 22 is illustrated in a simplified manner due to the restriction of the margin of the drawing, the exchange unit 22 has the same construction as that of the exchange unit 21.

The port processor interfaces 21a, 22a exchange control signals with the individual extension-line and trunk-line interface cards 11 to 14 via a control-channel highway CHW. The time switches 21b, 22b effect the switching of speech signals transmitted from and received at the extension-line and trunk-line interface cards 11 to 14 on a time-slot basis via a speech-channel data highway DHW. The time switches 21b, 22b also perform the switching of time slots for transmitting the dial tones and busy tones generated by a tone generator to the communication line of the destination location.

The PBX interfaces 21c, 22c fetch the changeover signal generated at the duplicated system control circuit 40 and collect various internal signals in the PBX by way of the duplicated system control circuit 40. The Ethernet interfaces 21d, 22d transmit and receive signals to and from Ethernet EN. Each of the microcomputers 21e, 22e contains a CPU, a ROM that stores software for the CPU, and a RAM that temporarily stores various control signals. The microcomputers 21e, 22e effect control for the transmission of various control signals.

The control units 31, 32 contain microprocessors 31a, 32a, peripheral interfaces 31b, 32b, and Ethernet interfaces 31c, 32c, respectively. The peripheral interfaces 31b, 32b exchange signals with peripherals, such as a hard disk unit HD or a floppy-disk unit FD. The Ethernet interfaces 31c, 32c transmit and receive signals to and from Ethernet EN. Each of the microcomputers 31a, 32a contains a CPU, a ROM that stores software for the CPU, and a RAM that temporarily stores various control signals.

To design the control units in a duplicated configuration, two microcomputers 31a, 32a are not necessarily provided.

A single microcomputer may be designed to have a duplicated function.

FIG. 2 is a block diagram of the structure of software for the exchange units 21, 22 and the control units 31, 32.

Each of the exchange units 21, 22 contains a communication protocol conversion program 200 only as a control function related to exchange. In addition to this, it contains a time switch (TSW) driver 210, an Ethernet driver 221, and a port processor interface driver (PP I/F driver) 222. The communication protocol conversion program 200 converts the communication protocol of the control signal peculiar to the PBX on the control-channel highway CHW into the communication protocol on Ethernet EN, and vice versa.

Each of the control units 31, 32 contains a general-purpose operating system (general-purpose OS) 300, such as UNIX or Windows NT, and a plurality of application programs executed on the general-purpose OS 300. The application programs include a group of exchange processing programs 311 to 314 and a group of ordinary programs 315 that carry out a communication management process of charging and communication history data and the processing of other general office work. The exchange processing program group is composed of a call processing terminal control program 311, a call processing group control program 312, a call processing service control program 313, and a maintenance program 314.

The control units 31, 32 contain a middleware 320 and an OS application interface (OS API) 321 which are provided between the general-purpose operating system 300 and the group of exchange processing application programs 311 to 314. The middleware 320 corresponds to a communication program between the conventional PBX scheduler and the processors and includes the structure of lower-level processors. The OS application interface 321 is a function interface that the OS 300 opens to the users. The interface 321 interfaces between the OS 300 and the individual application programs 311 to 315. The OS application interface 321 assures the compatibility between the individual application programs 311 to 314 and the OS 300 and can eliminate their dependence on the type of operating system 300. Therefore, even if the CPUs in the control units 31, 32 are changed, the application programs 311 to 314 and middleware 320 have only to be modified, as long as the OS application interface 321 remains unchanged. The OS API 321, OS 300, and the individual drivers 331, 332, 333, and 334 need not be modified.

The control units 31, 32 further contain an Ethernet driver 331, a hard-disk (HD) driver 332, a floppy-disk (FD) driver 333, and various peripheral drivers 334 for driving the other peripherals, such as a display unit. The Ethernet driver 331 is a software for driving the Ethernet interfaces 31c, 32c. The hard-disk driver 332 and floppy-disk driver 333 are softwares for driving the hard-disk interface and the floppy-disk interface, respectively.

Hereinafter, the operation of the embodiment thus constructed will be explained. Explanation will be given on the assumption that the exchange unit 21 and control unit 31 are set in an active system and the exchange unit 22 and control unit 32 are set in a standby system.

It is assumed that on the standard telephone TEL, a call origination to the public network has occurred. The off-hook operation at the standard telephone TEL is analyzed at the standard extension telephone interface card 11. The interface card 11 transfers the analysis result to the exchange unit 21 as the off-hook signal of the telephone via the control-channel highway CHW. It is further transferred from the exchange unit 21 to the control unit 31 via the Ethernet EN.

When the off-hook signal has been transferred to the control unit 31, the PBX scheduler function of the middleware 320 in the control unit 31 starts up the application program necessary for processing. Because what has been transferred is the off-hook signal of the standard telephone TEL, the standard telephone terminal processing program in the call processing terminal control program 311 is started up to perform a terminal process on the standard telephone TEL.

Specifically, when a group process of standard telephones is required, the standard telephone terminal processing program asks the telephone group control program in the call processing group processing program 312 via the middleware 320 to effect processing. When the terminals have to be connected to each other, the group control program asks the telephone service control program in the call processing service control program 313 via the middleware 320 to effect processing.

With the telephone service control program, for example, the control unit 31 transfers signals via the Ethernet EN to the exchange unit 21. A dial tone control signal to the calling standard telephone TEL is transferred to the time switch 21b and a control signal that permits the reception of the dial signal to the standard telephone interface. Then, after these control signals have been converted by the communication protocol conversion program 200 into the signal form unique to the exchange apparatus, the converted signals are transferred from the time switch 21b and PP I/F 21a respectively to the standard extension telephone interface card 11 via the control-channel highway CHW. When receiving the control signal, the standard extension telephone interface card 1 sends the dial tone from the time switch to the calling standard telephone TEL and from this time on, gets ready to receive the dial signal from the standard telephone TEL.

In this state, when the user at the standard telephone TEL which has acknowledged the dial tone dials, the dial signal is sent to the standard extension telephone interface card 11, which analyzes it. Then, the analyzed dial signal is transferred from the standard extension telephone interface card 11 to the exchange unit 21 via the control-channel highway CHW. In the exchange unit, the communication protocol conversion program 200 converts the analyzed dial signal into the Ethernet frame signals, which are transferred to the control unit 31 via the Ethernet EN.

The control unit 31 analyzes the address of the called party from the dial signal and, when finding that the address of the called party is the public network NW, generates a control signal for connecting an analog trunk by the call processing service control program 313. The control signal is transferred from the Ethernet interface 31c to the exchange unit 21 via the Ethernet EN. Then, after the control signal has been converted by the communication protocol conversion program 200 in the exchange unit 21 into the control signal unique to the exchange apparatus, the converted control signal is transferred to the analog trunk line interface card 13 via the control-channel highway CHW. After having received the control signal, the analog trunk-line interface card 13 seizes the trunk line, sends the dial signal to the public network, and waits for a response from the public network NW.

Then, when having been told from the public network NW that the terminal at the address of the called party is off the hook, the analog trunk-line interface card 13 transfers a control signal having this effect to the exchange unit 21 via the control-channel interface CHW. The control signal is further transferred from the control unit 21 to the control unit 31 via the Ethernet EN. Receiving the control signal, the control unit 31 generates a request to connect a speech channel and transfers the request to the time switch 21b via the Ethernet EN. Then, from this time on, the time switch 21b executes the process of connecting the speech channel between the standard extension telephone interface card 11 at the calling party and the analog trunk-line interface card 13. Thus, thereafter, the standard telephone TEL at the calling party can have a talk with the telephone at the called party connected to the public network NW.

As described above, with the electronic exchange apparatus of the embodiment, the exchange units 21, 22 for controlling the extension-line and trunk-line interface cards 11 to 14—the circuits peculiar to the exchanges—are provided separately from the general-purpose control units 31, 32. A connection between these exchange units 21, 22 and the control units 31, 32 is made via a signal transmission channel, such as the Ethernet EN, to transfer control signals. The exchange units 21, 22 are allowed to have only a communication protocol conversion function between the control-channel highway CHW unique to the exchange apparatus and the Ethernet EN, and all of the control functions related to the exchange processing are assigned to the control units 31, 32.

Therefore, with the present embodiment, what is constructed as a circuit unique to the apparatus is only the section that performs I/O of the hardware of the exchange apparatus. The hardware of the control units and the software including the operating system and application programs are general-purpose ones. This makes it possible to develop software, such as application programs for exchange processing, on the general-purpose control units 31, 32 without any modification, which increases the development efficiency remarkably and help cut costs.

Furthermore, because the peripherals, such as the hard disk unit HD, floppy-disk unit FD, display unit, printer, or modem, and various interfaces are connected to the general-purpose control units 31, 32, they may be general-purpose ones. This eliminates the necessity of developing dedicated peripherals and interfaces and makes it possible to easily keep up with new technology, such as optical disc units. In a conventional electronic exchange apparatus, the specific exchange unit was not separated from the general-purpose control unit. Since the various peripherals were connected to the exchange itself composed of dedicated components, the general-purpose peripherals could not be connected. Furthermore, with the present embodiment, if a new high-performance general-purpose CPU or operating system has been developed, use of the CPU or operating system will enable the apparatus to be upgraded readily or a new apparatus to be developed easily.

Since the Ethernet EN is used as control signal transmission means between the exchange units 21, 22 and the control units 31, 32, the control signal transmission channel may be general-purpose ones.

Furthermore, in the embodiment, the software in the control units 31, 32 is provided with the middleware 320 and application interface 321, which provides the interface between the general-purpose operating system 300 and the exchange processing application programs 311 to 314. This assures the compatibility between the individual application programs and the operating system and can eliminate their dependence on the type of operating system.

Furthermore, in the embodiment, the operating system, such as UNIX or Windows NT, is provided with development tools for application programs, such as various compilers and source-level debuggers. Therefore, by using these compilers and debuggers directly, software for exchange processing can be developed on the control units 31, 32 in the apparatus itself. Accordingly, even if a large application program is developed, it can be developed efficiently under the general-purpose operating system on the apparatus itself, without an expensive device, such as a dedicated emulator.

Furthermore, in the embodiment, because the control system is in a duplicated configuration using the exchange units 21, 22 and the control units 31, 32, the operating reliability of the apparatus is maintained high.

Other embodiments of the electronic exchange apparatus according to the present invention will be described. The same portions as those of the first embodiment will be indicated in the same reference numerals and their detailed description will be omitted.

(A Second Embodiment)

A second embodiment of the present invention is another embodiment using the Ethernet. In the second embodiment, the exchange units that control the extension-line and trunk-line interfaces provided in the first embodiment are eliminated. Instead, each of the extension-line interface, trunk-line interface, time switch, and duplicated system control circuit is provided with an Ethernet interface. Use of these Ethernet interfaces enables direct transmission of control signals between the extension-line and trunk-line interfaces, time switches, and duplicated system control circuit and the control units by means of the Ethernet.

FIG. 3 is a block diagram of the hardware configuration of an electronic private branch exchange apparatus according to the second embodiment.

A standard extension telephone interface card 11, a multifunction digital telephone interface card 12, an analog trunk-line interface card 13, and an ISDN trunk-line interface card 14 are provided with the Ethernet interfaces (E I/F) 11a, 12a, 13a, and 14a, respectively. Similarly, time switches 51, 52 and a duplicated system control circuit 40 are provided with the Ethernet interfaces 51a, 52a, 40a, respectively.

Use of the Ethernet interfaces connects the extension telephone interface cards 11, 12, the trunk-line interface cards 13, 14, the time switches 51, 52, and the duplicated system control circuit 40 to the Ethernet interfaces 31c, 32c in the control units 31, 32, and vice versa, by way of a control-channel highway E-CHW composed of the Ethernet.

The second embodiment thus constructed produces the following effect, in addition to the effect of the first embodiment.

When exchange processing is done, the control signals for exchange processing are transferred directly via the control-channel highway E-CHW using the Ethernet between the extension telephone interface cards 11, 12 and trunk-line interface cards 13, 14 and the control units 31, 32 and between the time switches 51, 52 and the control units 31, 32. Therefore, the control-channel highway in the electronic private branch exchange apparatus can be reduced to one type (two types of highway, the control highway CHW and the data highway DHW, are used in the first embodiment). This eliminates the process of converting the communication protocol between the control-channel highways. Specifically, the exchange units 21, 22 can be eliminated, which allows the control function of the electronic private branch exchange apparatus to be put together into only the control units 31, 32, thereby making the control function of the apparatus much opener.

(A Third Embodiment)

A third embodiment of the present invention is such that a port processor interface, a time switch interface, and a PBX interface—interfaces unique to the exchange apparatus are provided on an expansion board, which is connected to a PCI bus—an expansion bus for a general-purpose computer.

FIG. 4 is a block diagram of the hardware configuration of an electronic private branch exchange apparatus according to the third embodiment.

Provided on expansion boards 61, 62 are port processor interfaces (PP I/F) 61a, 62a, time switch interfaces (TSW I/F) 61a, 62a, and PBX interfaces (PBX I/F) 61c, 62c, which are all unique to the exchange apparatus. These interfaces unique to the exchange apparatus are connected to the expansion buses, such as PCI buses 71d, 72d of general-purpose computers and personal computers constituting control units 71, 72.

The control units 71, 72 contain microcomputers 71a, 72a, peripheral interfaces 71b, 72b, and the Ethernet interfaces 71c, 72c, respectively, which are connected as shown in FIG. 1. A hard-disk unit HD and a floppy-disk unit FD are connected to the peripheral interfaces 71b, 72b. A connection between the Ethernet interfaces 71c, 72c is made via the Ethernet EN. The Ethernet EN is used to transfer control signals for duplicated control between the control units 71, 72.

Figure 5:
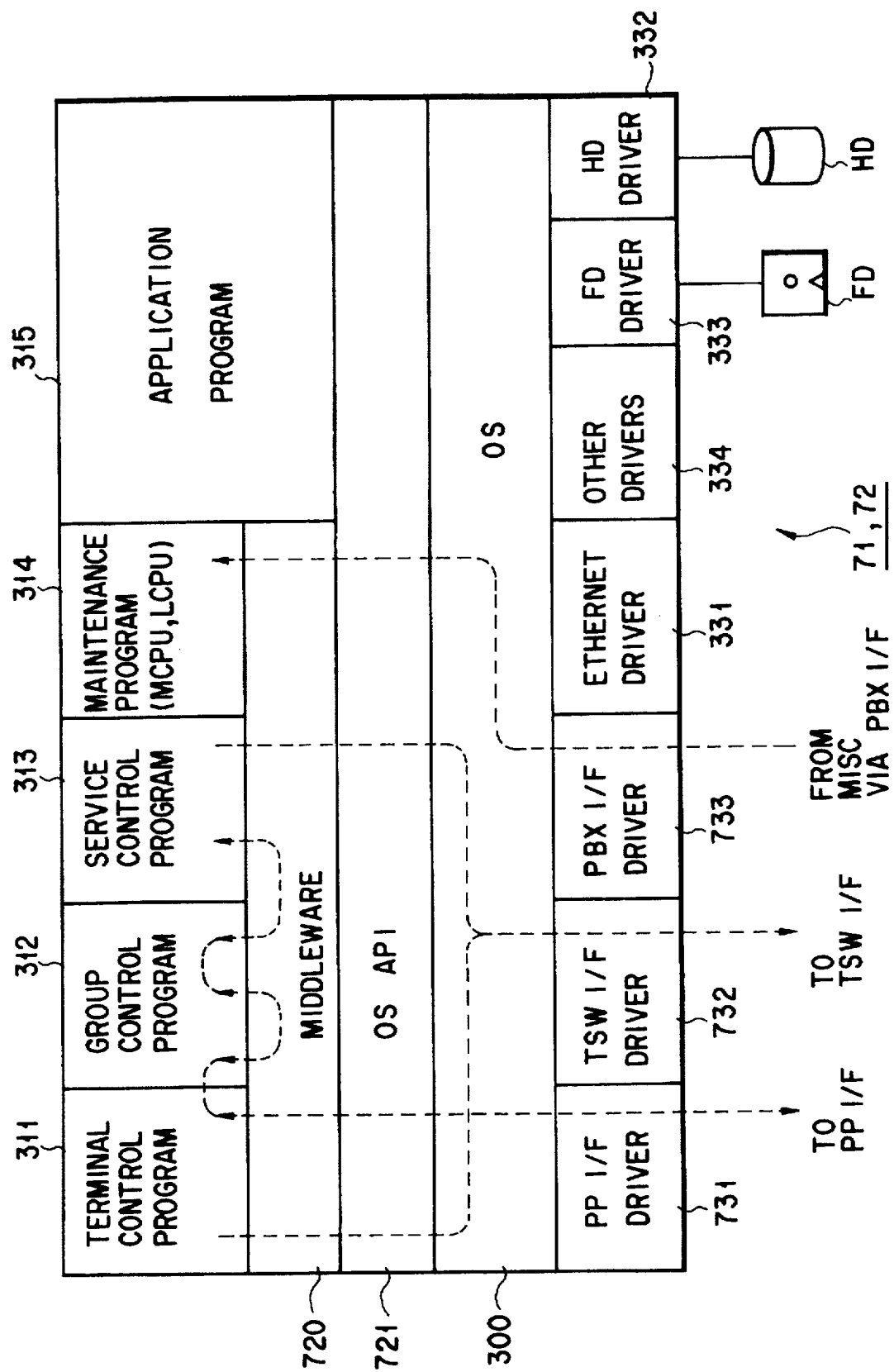
FIG. 5 shows the structure of software for the electronic private branch exchange apparatus according to the third embodiment.

FIG. 5 is a block diagram of the software configuration of the control units 71, 72. In the figure, the same parts as those in FIG. 2 are indicated by the same reference symbols.

The control units 71, 72 contain a general-purpose operating system (general-purpose OS) 300, such as UNIX or Windows NT, and a plurality of application programs executed on the general-purpose OS 300. The application programs include a group of exchange processing programs and a group of ordinary programs 315 that carry out a communication management process of charging or communication history data and the processing of other general office work.

The exchange processing program group is composed of a call processing terminal control program 311, a call processing group control program 312, a call process service control program 313, and a maintenance program 314. A middleware 720 and an application interface (OS API) 721 intervene between these exchange processing programs and the general-purpose OS 300.

Furthermore, the control units 71, 72 are additionally provided with a port processor interface driver (PP I/F driver) 731, a time switch interface driver (TSW I/F driver) 732, and a PBX interface driver (PBX I/F driver). These drivers 731 to 733 are software for controlling the operation of the interfaces 61a to 61c unique to the exchange apparatus and provided on the expansion boards 61, 62.

The operation of the third embodiment will be explained. In the exchange process, the various control signals for exchange processing generated at the control units 71, 72 are transferred from the drivers 731 to 733 to the interfaces 61a to 61c and 62a to 62c on the expansion boards 61, 62 via the expansion buses 71d, 72d.

For example, of the various control signals, the control signals associated with call processing control are transferred to the PP I/F 61a, 62a via the expansion buses 71d, 72d. Then, they are transferred directly from the PP I/F 61a, 62a to the interface cards 11 to 14 via the control-channel highway CHW. Furthermore, of the various control signals, the control signals related to the time switches are transferred to the TSW I/F 61b, 62b via the expansion buses 71d, 72d. Then, they are transferred from the TSW I/F 61b, 62b to the time switches 51, 52.

On the other hand, the PBX internal signals and the duplicated control signals are determined at the duplicated system control circuit 40 and transferred to the PBX I/F 61c, 62c. Then, they are transferred from the PBX I/F 61c, 62c to the control units 71, 72 via the expansion buses 71d, 72d. The maintenance program 314 performs a maintenance process on the basis of the transferred PBX internal signal and further provides changeover control from the active system to the standby system on the basis of the duplicated control signals.

Specifically, if the control unit 31 in the active system should not operate due to a failure, the failure will be sensed at the exchange unit 21 in the active system, which notifies the duplicated system control circuit 40 of the failure. Receiving the notice, the duplicated system control circuit 40 generates a control signal for switching the active system from the control unit 31 to the control unit 32, thereby switching to the good control unit. Should the exchange unit 21 fail, the failure will be sensed by the duplicated system control circuit 40. Then, the duplicated system control circuit 40 will generate a control signal for switching the active system from the exchange unit 21 to the exchange unit 31 in the standby system. The control signal will switch to the good exchange unit.

The third embodiment thus constructed produces the following effect, in addition to the effect of the first embodiment.

Use of the interfaces 61a to 61c and 62a to 62c unique to the exchange apparatus that are provided for the buses of the control units 71, 72 enables transmission of the control signals between the extension-line and trunk-line interface cards 11 to 14 and time switches 51, 52 all unique to the exchange apparatus and the control units 71, 72. Therefore, although the apparatus depends on the architecture of the control units 71, 72 because of connection of expansion buses, it has the advantage of eliminating the control sections of the exchange units (the microcomputers 21e, 22e in FIG. 1).

As explained above, with the present invention, the operation related to the exchange processing is controlled by the software in the general-purpose control unit by way of the control signal transmission means. Specifically, what is constructed as a circuit unique to the exchange apparatus is only the section that performs the input and output (I/O) of the hardware of the exchange apparatus, and the hardware of the control unit and the software including the operating system and application programs are general-purpose ones. This makes it possible to develop software including application programs for exchange processing on the general-purpose control units without any modification, which increases the development efficiency remarkably, thereby cutting costs.

Because the peripherals and various interfaces are connected to the general-purpose control units, they may be general-purpose ones. Therefore, they need not be developed for exclusive use, and the apparatus is capable of easily keeping up with new technology, such as optical disk units.

If a new high-performance general-purpose CPU or operating system has been developed, use of the CPU or operating system will enable the apparatus to be upgraded readily or a new apparatus to be developed easily. Namely, it is possible to make much opener electronic exchange apparatuses constructed as dedicated units in the past.

Furthermore, the following effect can be obtained by providing the software in the general-purpose control unit with a middleware. The middleware is for realizing on a general-purpose OS, such as UNIX, an exchange application interface for an OS for the exchange only on conventional dedicated hardware. The application interface is an interface specified for each OS and enables the OS function to be used from the application. The middleware is used to remapping the OS interface for the exchange onto the application interface, which makes it possible to recompile and use, without any modification, the call processing terminal program—exchange software developed on an OS for a conventional exchange only—or the source program in the C language, such as the maintenance program.

If the CPUs are of the same type, the application binary interface will enable the object program to operate without recompiling the source program. Specifically, by using the OS application interface via the middleware, conventional exchange processing application software not only requires no modification of the source program, but also is made highly versatile or much less dependent on the type of OS or CPU.

Furthermore, by providing the general-purpose operating system with application program development tools, such as various compilers and source-level debuggers, it is possible to develop exchange processing software in the general-purpose control unit in the apparatus itself using the compilers and debuggers. Therefore, even if a large application program is developed, it can be developed efficiently under the general-purpose operating system on the apparatus itself, without an expensive unit, such as a dedicated emulator.

Additionally, by using the general-purpose bus line or the general-purpose communication line in the general-purpose control unit as the transmission channel for the control signals, the exchange units can be connected and controlled as one of the peripherals for the general-purpose control units, such as a personal computer or a workstation. Accordingly, as long as the communication protocol between the exchange units and the general-purpose control units is observed in the control signal transmission means, exchange processing software can be made versatile completely.

Furthermore, the general-purpose control units or exchange units that have been selected can increase the reliability of the operation of the apparatus by providing a plurality of general-purpose control units having the same function on the transmission channel for control signals and causing the control signal transmission means to select a good one from the general-purpose control units and transfer the control signals, or by providing a plurality of exchange units having the same function on the transmission channel for control signals, selecting a good one from the exchange units, and transferring the control signals.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, two or more of the embodiment described above may be combined suitably. While in the first and second embodiments, the transmission of control signals between the exchange units and the control units is effected using the Ethernet, LANs using token rings or ATM (asynchronous transfer mode) or wireless LANs may be used.

Although in the embodiments, the central control unit of the electronic private branch exchange apparatus is composed of the general-purpose control unit of a personal computer or a workstation, a general-purpose computer, such as a personal computer or a workstation, may be provided with an exchange unit and a connection between the exchange unit and the control unit of the general-purpose computer may be made by means of a CPU bus or a transmission channel, such as the Ethernet. In this case, the exchange unit and transmission interface unit are prepared as options of the general-purpose computer. The user adds the options as the need arises, which enables the present general purpose computer to be used, for example, in office work or business management to function further as a private branch exchange or a key telephone main unit. Therefore, although in the past, the users had to buy a dedicated private branch exchange separately from the general-purpose computer used for office work, the above configuration enables them to add only the options to achieve the same purpose, which makes it possible to install an exchange at a low cost.

As for the configuration of the exchange unit, the configuration of the control signal transmission means, the structure of the software in the general-purpose control unit, and the type of general-purpose OS, they may be practiced or embodied in still other ways without departing from the spirit or essential character of the present invention.

What is claimed is:

1. An electronic exchange apparatus comprising:
   exchange means connected to a plurality of communication terminal devices and for performing an exchange operation between said plurality of communication terminal devices based on a control signal in a first format;
   control means for generating a control signal in a second format necessary for the exchange operation by said exchange means;
   control signal transmission means connected between said control means and said exchange means for bidirectionally transmitting a control signal in a third format;
   first interface means connected between said exchange means and said control signal transmission means for converting the control signal in the first format to a control signal in the third format and vice versa; and
   second interface means connected between said control means and said control signal transmission means for converting the control signal in the second format to a control signal in the third format and vice versa;
   wherein said exchange means further comprises a time switch, a port processor interface, and a CPU connected to said time switch, port processor interface, and said first interface means.

2. An electronic exchange apparatus according to claim 1, wherein said control means comprises software including:
   an operating system;
   an application program for exchange processing which is executed on said operating system; and
   middleware which provides an interface between said operating system and said application program.

3. An electronic exchange apparatus according to claim 2, wherein said operating system is provided with application program development tools.

4. An electronic exchange apparatus according to claim 1, wherein said first and second interface means are designed in a duplicated configuration in such a manner that while one of the duplicated interface means is in operation, the other is on standby, and wherein said control signal transmission means further comprises means for determining whether or not the one interface means in operation is operating normally and means for switching the other interface means on standby to operation when it is determined that the one interface means in operation is operating abnormally.

5. An electronic exchange apparatus according to claim 1, wherein said first interface means is included in said control signal transmission means.

6. An electronic exchange apparatus according to claim 1, wherein said first interface means is designed in a duplicated configuration in such a manner that while one of the duplicated interface means is in operation, the other is on standby, and wherein said control signal transmission means further comprises means for detecting whether or not the one interface means in operation is operating normally and means for switching the other interface means on standby to operation when it is determined that the one interface means in operation is operating abnormally.

7. An electronic exchange apparatus according to claim 1, wherein said second interface means is included in said control signal transmission means.

8. An electronic exchange apparatus according to claim 1, wherein said second interface means is designed in a duplicated configuration in such a manner that while one of the duplicated interface means is in operation, the other is on standby, and wherein said control signal transmission means further comprises means for determining whether or not the one interface means in operation is operating normally and means for switching the other interface means on standby to operation when it is determined that the one interface means in operation is operating abnormally.

9. An electronic exchange apparatus according to claim 1, wherein said control signal transmission means transmits the control signal in the third format between said exchange means and said control means via a general-purpose bus line for said control means.

10. An electronic exchange apparatus according to claim 1, wherein said control signal transmission means transmits the control signal in the third format between said exchange means and said control means via a general-purpose communication network.

11. An electronic exchange apparatus according to claim 1, wherein said control means is designed in a duplicated configuration, and wherein said control signal transmission means comprises means for determining whether or not each of said control means in the duplicated configuration is operating normally, means for selecting the control means judged to be normal, and means for transmitting the control signal related to a selected control means.

12. An electronic exchange apparatus according to claim 1, wherein said exchange means is designed in a duplicated configuration, and wherein said control signal transmission means comprises means for determining whether or not each of said exchange means in the duplicated configuration is operating normally, means for selecting the exchange means judged to be normal, and means for transmitting the control signal related to a selected exchange means.

13. An electronic exchange apparatus according to claim 1, wherein said exchange means comprises:
   a first interface connected to a telephone terminal;
   a second interface connected to a public line; and
   a time switch connected to said first and second interfaces.

14. An electronic exchange apparatus according to claim 13, wherein said exchange means further comprises:
   a data highway which connects said first and second interfaces to said time switch and transmits speech signals; and
   a control highway which is connected to said first and second interfaces and transmits control signals.

15. An electronic exchange apparatus according to claim 13, wherein said control signal transmission means connects said first and second interfaces to said time switch.

16. An electronic exchange apparatus comprising:

exchange means, connected to communication terminal devices via a control channel highway for transferring a control signal in a first format, and connected to a data highway for transferring a communication signal for performing an exchange operation between said communication terminal devices;

control means, connected to said exchange means via a computer network, for controlling said exchange means based on a control signal in a second format, said exchange means comprising first interface means, connected to said computer network, for converting the control signal in the first format to a control signal in a third format suitable for the computer network and vice versa, and said control means comprising second interface means, connected to said computer network, for converting the control signal in the second format to a control signal in the third format and vice versa.

17. An electronic exchange apparatus according to claim 16, wherein said exchange means further comprises a time switch connected to said data highway, a port processor interface connected to said control channel highway, and a CPU connected to said time switch, port processor interface, and said first interface means.

18. An electronic exchange apparatus according to claim 16, wherein said exchange means comprises two-exchange devices one of which is in operation and the other is on standby, and said control means comprises two control devices one of which is in operation and the other is on standby, said two exchange devices and said two control devices are connected via said computer network.

19. An electronic exchange apparatus according to claim 16, wherein said control means comprises software including:

an operating system;

an application program for exchange processing executed on said operating system; and middleware providing an interface between said operating system and said application program.

20. An electronic exchange apparatus according to claim 19, wherein said operating system is provided with application program development tools.

21. An electronic exchange apparatus comprising:

exchange means connected to communication terminal devices via a data highway for transferring a communication signal and for performing an exchange operation between said communication terminal devices based on a control signal in a first format;

first interface means connected to said communication terminal devices via a communication network for transferring a control signal in a second format and for converting the control signal in the first format to a control signal in the second format and vice versa; and control means connected to said exchange means via the communication network, for controlling said exchange means based on a control signal in a third format, the control means comprising second interface means for converting the control signal the second format to a control signal in the third format and vice versa.

22. An electronic exchange apparatus according to claim 21, wherein said exchange means comprises two exchange devices one of which is in operation and the other is on standby, and said control means comprises two control devices one of which is in operation and the other is on standby, said two exchange devices and said two control devices being connected via said computer network.

23. An electronic exchange apparatus according to claim 21, wherein said control means comprises software including:

an operating system;

an application program for performing exchange processing executed on said operating system; and middleware providing an interface between said operating system and said application program.

24. An electronic exchange apparatus according to claim 23, wherein said operating system is provided with application program development tools.

25. An electronic exchange apparatus comprising:

exchange means connected to communication terminal devices via a data highway for transferring a communication signal and for performing an exchange operation between said communication terminal devices based on a control signal in a first format; and control means connected to said communication terminal devices via a control channel highway and connected to said exchange means for controlling said exchange means based on a control signal in a third format, the control means comprising first interface means for converting the control signal in the third format to a control signal in the second format and vice versa and second interface means for converting the control signal in the third format to a control signal in the second format and vice versa.

26. An electronic exchange apparatus according to claim 25, wherein said exchange means comprises two exchange devices one of which is in operation and the other is on standby, and said control means comprises two control devices one of which is in operation and the other is on standby, said two control devices connected via a computer network.

27. An electronic exchange apparatus according to claim 25, wherein said control means comprises software including:

an operating system;

an application program for performing exchange processing executed on said operating system; and middleware providing an interface between said operating system and said application program.

28. An electronic exchange apparatus according to claim 27, wherein said operating system is provided with application program development tools.

29. A method of originating a call through a private branch exchange apparatus, comprising the following steps:

transferring an off-hook signal in a first format from a call originating terminal to exchange means via a control channel highway;

converting the off-hook signal in the first format to a off-hook signal in a second format;

transferring the off-hook signal in the second format to control means via a computer starting up a terminal processing program stored in the control means to perform a terminal process with respect to the call originating terminal;

transferring a dial tone control signal in a second format from the control means to said exchange means via the computer network;

converting the dial tone control signal in the second format to a the dial tone control signal in the first format;

transferring the dial tone control signal in the first format to the call originating terminal via the control channel highway;

transferring a dial signal including an address of a called party in the first format from the call originating terminal to the exchange means via the control channel highway;

connecting the call originating terminal and the called party on the basis of the address included in the dial signal.

30. An electronic exchange apparatus connected to a computer which generates a control signal in a first format necessary for exchange operation, the apparatus comprising:

exchange means connected to a plurality of communication terminal devices, the exchange means having hardware unique to the communication terminal devices and performing an exchange operation between said plurality of communication terminal devices based on a control signal in a first format;

interface means connected to said exchange means for converting the control signal in the first format to a control signal in the second format and vice versa; and control signal transmission means connected between said computer and said interface means for bidirectionally transferring the control signal in the second format.

31. An electronic exchange apparatus comprising:

exchange means connected to a plurality of communication terminal devices and performing an exchange operation between said plurality of communication terminal devices based on a control signal in a first format;

control means for generating a control signal in the first format necessary for the exchange operation by said exchange means;

control signal transmission means connected between said control means and said exchange means and which bidirectionally transmits a control signal in a second format;

first interface means connected between said exchange means and said control signal transmission means for converting the control signal in the first format to a control signal in the second format and vice versa; and second interface means connected between said control means and said control signal transmission means for converting the control signal in the second format to a control signal in the first format and vice versa.

32. An electronic exchange apparatus according to claim 31, wherein said control means comprises software including:

an operating system;

an application program for exchange processing which is executed on said operating system; and middleware providing an interface between said operating system and said application program.

33. An electronic exchange apparatus according to claim 32, wherein said operating system is provided with application program development tools.

34. An electronic exchange apparatus according to claim 31, wherein said first and second interface means are designed in a duplicated configuration in such a manner that while one of the duplicated interface means is in operation, the other is on standby, and wherein said control signal transmission means further comprises means for determining whether or not the one interface means in operation is operating normally and means for switching the other interface means on standby to operation when it is determined that the one interface means in operation is operating abnormally.

35. An electronic exchange apparatus according to claim 31, wherein said first interface means is included in said control signal transmission means.

36. An electronic exchange apparatus according to claim 31, wherein said first interface means is designed in a duplicated configuration in such a manner that while one of a duplicated first interface means is in operation, the other is on standby, and wherein said control signal transmission means further comprises means for detecting whether or not the one interface means now in operation is operating normally and means for switching the other interface means on standby to operation when it is determined that the one interface means in operation is operating abnormally.

37. An electronic exchange apparatus according to claim 31, wherein said second interface means is included in said control signal transmission means.

38. An electronic exchange apparatus according to claim 31, wherein said second interface means is designed in a duplicated configuration in such a manner that while one of a duplicated interface means is in operation, the other is on standby, and wherein said control signal transmission means further comprises means for determining whether or not the one interface means in operation is operating normally and means for switching the other interface means on standby to in operation when it is determined that the one interface means in operation is operating abnormally.

39. An electronic exchange apparatus according to claim 31, wherein said control signal transmission means transmits the control signal between said exchange means and said control means via a general-purpose bus line for said control means.

40. An electronic exchange apparatus according to claim 31, wherein said control signal transmission means transmits the control signal between said exchange means and said control means via a general-purpose communication network.

41. An electronic exchange apparatus according to claim 31, wherein said control means is designed in a duplicated configuration, and wherein said control signal transmission means comprises means for determining whether or not each of said control means in the duplicated configuration is operating normally, means for selecting the control means judged to be normal, and means for transmitting the control signal related to a selected control means.

42. An electronic exchange apparatus according to claim 31, wherein said exchange means is designed in a duplicated configuration, and wherein said control signal transmission means comprises means for determining whether or not each of said exchange means in the duplicated configuration is operating normally, means for selecting the exchange means judged to be normal, and means for transmitting the control signal related to a selected exchange means.

43. An apparatus according to claim 31, wherein said exchange means comprises:

a first interface connected to a telephone terminal;

a second interface connected to a public line; and a time switch connected to said first and second interfaces.

44. An electronic exchange apparatus according to claim 43, wherein said exchange; means further comprises:

a data highway which connects said first and second interfaces to said time switch and transmits speech signals; and a control highway which is connected to said first and second interfaces and transmits control signals.

45. An electronic exchange apparatus according to claim 43, wherein said control signal transmission means connects said first and second interfaces to said time switch.

46. An electronic exchange apparatus comprising:

exchange means connected to a plurality of communication terminal devices and performing an exchange operation between said plurality of communication terminal devices based on a control signal in a first format;

control means for generating a control signal in a second format necessary for the exchange operation by said exchange means;

control signal transmission means which is connected between said control means and said exchange means, the control signal transmission means transmitting a control signal in a third format from said control means to said exchange means;

first interface means connected between said exchange means and said control signal transmission means for converting the control signal in the third format to a control signal in the first format; and second interface means connected between said control means and said control signal transmission means for converting the control signal in the second format to a control signal in the third format.

47. An electronic exchange apparatus according to claim 46, wherein said control means comprises software including:

an operating system;

an application program for performing exchange processing executed on said operating; system; and middleware providing an interface between said operating system and said application program.

48. An electronic exchange apparatus according to claim 47, wherein said operating system is provided with application program development tools.

49. An electronic exchange apparatus according to claim 46, wherein said first and second interface means are designed in a duplicated configuration in such a manner that while one of the duplicated interface means is in operation, the other is on standby, and wherein said control signal transmission means further comprises means for determining whether or not the one interface means in operation is operating normally and means for switching the other interface means on standby to operation when it is determined that the one interface means in operation is operating abnormally.

50. An electronic exchange apparatus according to claim 46, wherein said first interface means is included in said control signal transmission means.

51. An electronic exchange apparatus according to claim 46, wherein said first interface means is designed in a duplicated configuration in such a manner that while one of a duplicated interface means is in operation, the other is on standby, and wherein said control signal transmission means further comprises means for detecting whether or not the one interface means in operation is operating normally and means for switching the other interface means on standby to operation when it is determined that the one interface means in operation is operating abnormally.

52. An electronic exchange apparatus according to claim 46, wherein said second interface means is included in said control signal transmission means.

53. An electronic exchange apparatus according to claim 46, wherein said second interface means is designed in a duplicated configuration in such a manner that while one of a duplicated interface means is in operation, the other is on standby, and wherein said control signal transmission means further comprises means for determining whether or not the one interface means in operation is operating normally and means for switching the other interface means on standby to operation when it is determined that the one interface means in operation is operating abnormally.

54. An electronic exchange apparatus according to claim 46, wherein said control signal transmission means transmits the control signal in the third format from said control means to said exchange means via a general-purpose bus line for said control means.

55. An electronic exchange apparatus according to claim 46, wherein said control signal transmission means transmits the control signal in the third format from said control means to said exchange means via a general-purpose communication network.

56. An electronic exchange apparatus according to claim 46, wherein said control means is designed in a duplicated configuration, and wherein said control signal transmission means comprises means for determining whether or not each of said control means in the duplicated configuration is operating normally, means for selecting the control means judged to be normal, and means for transmitting the control signal related to a selected control means.

57. An electronic exchange apparatus according to claim 46, wherein said exchange means is designed in a duplicated configuration, and wherein said control signal transmission means comprises means for determining whether or not each of said exchange means in the duplicated configuration is operating normally, means for selecting the exchange means judged to be normal, and means for transmitting the control signal related to a selected exchange means.

58. An electronic exchange apparatus according to claim 46, wherein said exchange means comprises:

a first interface connected to a telephone terminal;

a second interface connected to a public line; and a time-switch connected to said first and second interfaces.

59. An electronic exchange apparatus according to claim 58, wherein said exchange means further comprises:

a data highway which connects said first and second interfaces to said time switch and transmits speech signals; and a control highway which is connected to said first and second interfaces and transmits control signals.

60. An electronic exchange apparatus according to claim 58, wherein said control signal transmission means connects said first and second interfaces to said time switch.

61. An electronic exchange apparatus comprising:

exchange means connected to a plurality of communication terminal devices and performing an exchange operation between said plurality of communication terminal devices based on a control signal in a first format;

control means for generating a control signal in the first format necessary for the exchange operation by said exchange means;

control signal transmission means which is connected between said control means and said exchange means and transmits a control signal in a second format;

first interface means connected between said exchange means and said control signal transmission means for converting the control signal in the second format to a control signal in the first format; and second interface means connected between said control means and said control signal transmission means for converting the control signal in the second format to a control signal in the first format.

62. An electronic exchange apparatus according to claim 61, wherein said control means comprises software including:

an operating system;

an application program for performing exchange processing which is executed on said operating system; and middleware providing an interface between said operating system and said application program.

63. An electronic exchange apparatus according to claim 62, wherein said operating system is provided with application program development tools.

64. An electronic exchange apparatus according to claim 61, wherein said first and second interface means are designed in a duplicated configuration in such a manner that while one of the duplicated interface means is in operation, the other is on standby, and wherein said control signal transmission means further comprises means for determining whether or not the one interface means in operation is operating normally and means for switching the other interface means on standby to operation when it is determined that the one interface means in operation is operating abnormally.

65. An electronic exchange apparatus according to claim 61, wherein said first interface means is included in said control signal transmission means.

66. An electronic exchange apparatus according to claim 61, wherein said first interface means is designed in a duplicated configuration in such a manner that while one of the duplicated interface means is in operation, the other is on standby, and wherein said control signal transmission means further comprises means for detecting whether or not the one interface means in operation is operating normally and means for switching the other interface means on standby to in operation when it is determined that the one interface means in operation is operating abnormally.

67. An electronic exchange apparatus according to claim 61, wherein said second interface means is included in said control signal transmission means.

68. An electronic exchange apparatus according to claim 61, wherein said second interface means is designed in a duplicated configuration in such a manner that while one of the duplicated interface means is in operation, the other is on standby, and wherein said control signal transmission means further comprises means for determining whether or not the one interface means in operation is operating normally and means for switching the other interface means on standby to operation when it is determined that the one interface means in operation is operating abnormally.

69. An electronic exchange apparatus according to claim 61, wherein said control signal transmission means transmits the control signal from said control means to said exchange means via a general-purpose bus line for said control means.

70. An electronic exchange apparatus according to claim 61, wherein said control signal transmission means transmits the control signal from said control means to said exchange means via a general-purpose communication network.

71. An electronic exchange apparatus according to claim 61, wherein said control means is designed in a duplicated configuration, and wherein said control signal transmission means comprises means for determining whether or not each of said control means in the duplicated configuration is operating normally, means for selecting the control means judged to be normal, and means for transmitting the control signal related to a selected control means.

72. An electronic exchange apparatus according to claim 61, wherein said exchange means is designed in a duplicated configuration, and wherein said control signal transmission means comprises means for determining whether or not each of said exchange means in the duplicated configuration is operating normally, means for selecting the exchange means judged to be normal, and means for transmitting the control signal related to a selected exchange means.

73. An apparatus according to claim 61 wherein said exchange means comprises:

a first interface connected to a telephone terminal;

a second interface connected to a public line; and a time switch connected to said first and second interfaces.

74. An electronic exchange apparatus according to claim 63, wherein said exchange means further comprises:

a data highway which connects said first and second interfaces to said time switch and transmits speech signals; and a control highway which is connected to said first and second interfaces and transmits control signals.

75. An electronic exchange apparatus according to claim 63, wherein said control signal transmission means connects said first and second interfaces to said time switch.

* * * * *